(12) United States Patent
Yazdi et al.

(10) Patent No.: US 11,498,826 B2
(45) Date of Patent: Nov. 15, 2022

(54) SYSTEMS, DEVICES, AND METHODS FOR PAIRING KEGS AND TAPS

(71) Applicant: Evigia Systems, Inc., Ann Arbor, MI (US)

(72) Inventors: Navid Yazdi, Ann Arbor, MI (US); Michael Young, Ann Arbor, MI (US); Siva Aduri, Ann Arbor, MI (US); Mark Krammer, Ann Arbor, MI (US)

(73) Assignee: Evigia Systems, Inc., Ann Arbor, MI (US)

( * ) Notice: Subject to any disclaimer, the term of this patent is extended or adjusted under 35 U.S.C. 154(b) by 209 days.

(21) Appl. No.: 17/029,292

(22) Filed: Sep. 23, 2020

(65) Prior Publication Data

US 2021/0087044 A1    Mar. 25, 2021

Related U.S. Application Data

(60) Provisional application No. 62/905,405, filed on Sep. 25, 2019.

(51) Int. Cl.
| | |
|---|---|
| *H04W 4/80* | (2018.01) |
| *B67D 1/08* | (2006.01) |
| *H04W 76/14* | (2018.01) |
| *H04N 5/33* | (2006.01) |
| *G06K 7/14* | (2006.01) |
| *G08B 21/18* | (2006.01) |

(52) U.S. Cl.
CPC ......... *B67D 1/0888* (2013.01); *B67D 1/0801* (2013.01); *G06K 7/1413* (2013.01); *G08B 21/18* (2013.01); *H04N 5/33* (2013.01); *H04W 76/14* (2018.02); *B67D 2001/0811* (2013.01)

(58) Field of Classification Search
CPC combination set(s) only.
See application file for complete search history.

(56) References Cited

U.S. PATENT DOCUMENTS

| | | | |
|---|---|---|---|
| 7,864,041 B2 * | 1/2011 | Godlewski | G06Q 10/087 340/572.1 |
| 10,315,906 B1 * | 6/2019 | Nicol | B67D 1/1411 |
| 2006/0132351 A1 * | 6/2006 | Le Sesne | G01F 23/2845 342/124 |

(Continued)

FOREIGN PATENT DOCUMENTS

| | | |
|---|---|---|
| WO | 2004056695 | 7/2004 |
| WO | 2010093747 | 8/2010 |
| WO | 2016089389 | 6/2016 |

OTHER PUBLICATIONS

International Search Report & Written Opinion, for International Application No. PCT/US2020/052469, dated Jan. 8, 2021, (9 pages).

*Primary Examiner* — Cindy Trandai
(74) *Attorney, Agent, or Firm* — Hartman Global IP Law; Gary M. Hartman; Domenica N.S. Hartman (57) ABSTRACT

Automatic identification and pairing authentication systems, devices, and methods capable of identifying and verifying the pairing of kegs and taps regardless of the position of a tap relative to a keg on which it is installed. Such a system includes an identification (ID) unit integrated onto a keg and a pairing device integrated onto a tap, wherein the ID unit and the pairing device communicate through a wireless connection.

32 Claims, 6 Drawing Sheets

(56) References Cited

U.S. PATENT DOCUMENTS

| | | | |
|---|---|---|---|
| 2008/0189078 A1* | 8/2008 | Vok | B67D 1/0831 |
| | | | 702/188 |
| 2008/0195251 A1 | 8/2008 | Milner | |
| 2012/0059513 A1* | 3/2012 | Perkins | B67D 1/0829 |
| | | | 222/23 |
| 2012/0126949 A1* | 5/2012 | Downie | G06K 19/07749 |
| | | | 340/10.1 |
| 2014/0327524 A1* | 11/2014 | Jones | G06K 7/10108 |
| | | | 340/10.42 |
| 2015/0109143 A1 | 4/2015 | Hershberger et al. | |
| 2015/0251331 A1 | 9/2015 | Vandergon et al. | |
| 2016/0073439 A1* | 3/2016 | Palin | H04W 4/80 |
| | | | 455/41.2 |
| 2016/0296810 A1* | 10/2016 | Mandel | H04B 5/0062 |
| 2017/0287313 A1* | 10/2017 | Park | A61B 5/002 |
| 2018/0272240 A1* | 9/2018 | Soudek | A63H 3/28 |
| 2020/0034583 A1* | 1/2020 | Nikitin | G06K 7/10128 |
| 2020/0341201 A1* | 10/2020 | Leigh | G02B 6/3825 |
| 2020/0405316 A1* | 12/2020 | Shelton, IV | A61B 17/1285 |
| 2021/0081891 A1* | 3/2021 | McLellan | G06Q 10/087 |

* cited by examiner

SYSTEMS, DEVICES, AND METHODS FOR PAIRING KEGS AND TAPS

CROSS-REFERENCE TO RELATED APPLICATIONS

This application claims the benefit of U.S. Provisional Application No. 62/905,405, filed Sep. 25, 2019, the contents of which are incorporated herein by reference.

BACKGROUND OF THE INVENTION

The present invention generally relates to systems, devices, and methods that are capable of accurately identifying and verifying the proper pairing of kegs and taps.

Draft beer and other malt beverages (hereinafter, collectively referred to as beer) are commonly available in kegs ("on tap") when sold in bars, restaurants, and other points of sale. Draft beer is popular for its higher quality and in some cases a larger serving size compared with the same beer served in a bottle or can at the same price. Kegs are tapped with a tap that mounts to the opening (bung) of the keg, typically formed in a neck (collar) that protrudes from one end of the keg. Taps are often manufactured to indicate a beer manufacturer's brand, beer style, etc., so that a specific tap can be installed on a keg and used to identify the beer contained in the keg.

Kegs are often stored in a dedicated storage area or room and retrieved as needed to serve customers. Assuring that a tap installed on a keg correctly identifies the beer contained in the keg, referred to herein as pairing, is important since at the point of dispensing of the beer only the tap identifies the beer. On occasion, due to unintentional or intentional errors, a specific branded beer tap may be installed on a non-matching keg, in other words, incorrectly paired because the contents of the keg do not match the beer brand indicated by the tap. In such cases, a lower priced or grade of beer may be served through a branded tap, which defrauds the customer and damages the beer manufacturer's brand if a lower quality beer is dispensed.

There are several technologies that are capable of providing automatic identification (ID) for purposes of monitoring and verifying proper pairing of a keg and tap. The keg and tap can each be equipped with an electronic ID device that enables pairing authentication performed by an electronic device integrated with the tap and/or placed in the keg storage room or other remote location. The electronic device communicates with the keg and tap electronic ID devices through a wireless or possibly a wired link. For practical considerations and ease of operation, it is preferred to have a non-contact or wireless data link between the keg and tap electronic ID devices regardless of where their pairing authentication is performed. One approach is to use wireless devices with far-field radio frequency (RF) data-link connectivity. The challenge with application of this technology is the likelihood of crosstalk between kegs that are adjacent to each in the same storage or tapping area. To address this issue, an automatic ID device (tag) that utilizes a non-contact data link technology having a limited range, as nonlimiting examples, devices that utilize acoustic, near-field radio frequency (RF) including inductively or capacitively coupled wireless, or optical/vision technologies, can be integrated with a keg along with a keg auto-identification (auto-ID) receiving device integrated with the tap as an add-on module attached to the exterior of the tap or embedded within the handle of the tap. However, because taps are typically threaded onto a keg, when a tap is installed on a keg the rotational position of the tap relative to the keg will vary depending on the start and end of the thread turns. This variation in the position (or relative location) of the auto-ID receiving device integrated onto a tap may result in a longer distance to the tag integrated onto the keg, which may make the pairing error rate non-negligible and unacceptable depending on the position of the tap.

BRIEF SUMMARY OF THE INVENTION

The subject matter of this invention includes systems, devices, and methods that are capable of accurately identifying and verifying the proper pairing of kegs and taps regardless of the position of a tap relative to a keg on which it is installed.

According to one aspect of the invention, an automatic identification and pairing authentication system is provided that comprises an identification (ID) unit integrated onto a keg and a pairing device integrated onto a tap, wherein the ID unit and the pairing device communicate through a wireless connection.

According to another aspect of the invention, an automatic identification and pairing authentication system for pairing a keg with a tap installed on the keg includes an identification unit compromising at least a first short-range wireless identification device integrated onto an end wall of the keg, and a pairing device on the tap and comprising a receiver for receiving short-range wireless information from the first short-range wireless ID device of the identification unit. The short-range wireless identification device surrounds an opening of the keg in which the tap is installed so that the pairing device identifies and verifies pairing of the keg and the tap regardless of a rotational position of the tap relative to the keg.

According to yet another aspect of the invention, a method of automatically identifying and pairing a keg with a tap installed on the keg includes using at least a first short-range wireless ID device associated with an identification unit to provide short-range wireless information, and using a pairing device on the tap to receive the short-range wireless information from the first short-range wireless ID device. The first short-range wireless identification device is integrated onto an end wall of a keg, and identifying and verifying pairing of the keg and the tap is performed with the pairing device regardless of a rotational position of the tap relative to the keg.

Technical aspects of systems, devices, and methods having features as described above preferably include the ability for a tap to identify a keg on which it is installed for purposes of identifying the contents within the keg, with reduced likelihood of crosstalk with adjacent kegs. Such a capability is advantageous when performing automatic identification and pairing of kegs with their corresponding taps in a restaurant or bar setting. The systems, devices, and methods help to prevent errors or misuses if a tap is installed on a keg whose contents do not match the identify of the beverage associated with the tap. The systems, devices, and methods are capable of providing high accuracy of authentication, while optionally providing additional functionality for actions or data capture when a tap is paired with a keg and activated.

Other aspects and advantages of this invention will be appreciated from the following detailed description.

DETAILED DESCRIPTION OF THE INVENTION

The following disclosure describes various aspects of systems, devices, and methods schematically represented in FIGS. 1 through 8 and adapted to accurately identify and verify the proper pairing of kegs and taps regardless of the position of the tap relative to a keg on which it is installed. Physical embodiments of systems and devices represented in FIGS. 1 through 5 are shown as used in association with kegs 10 having a generally common configuration, in which each keg 10 has an opening (bung) to which a tap 14 can be mounted to dispense the contents of the keg 10, and each opening is represented as formed in a neck (collar) 12 that protrudes from one end of the keg 10. While the kegs 10 are believed to be of a conventional form, the systems and devices described herein can be used with kegs having configurations other than what is shown in FIGS. 1 through 5.

Figure 1:
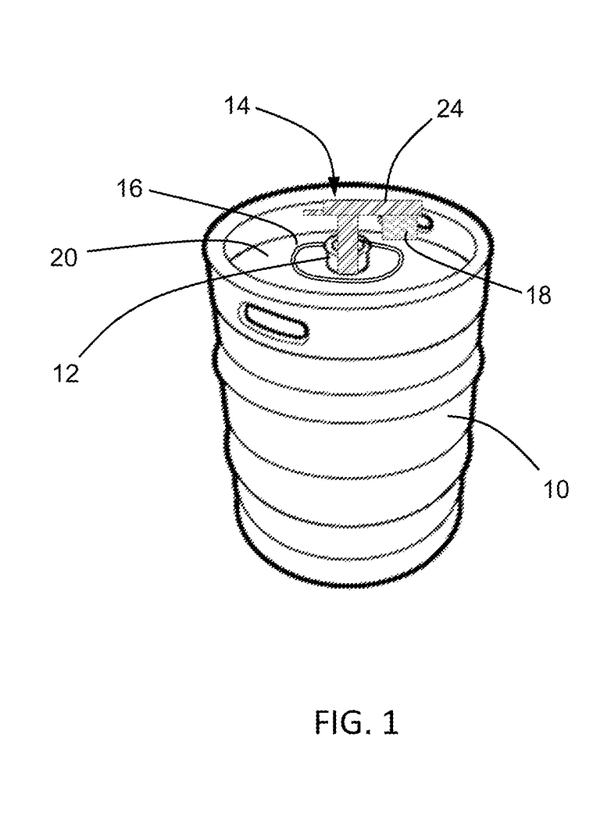
FIGS. 1 and 2 schematically represent automatic identification and pairing authentication systems comprising an identification (ID) unit integrated onto a keg in the vicinity of the opening (bung) of the keg, and a pairing device integrated onto a tap installed on the opening of the keg in accordance with nonlimiting embodiments of the invention.
Figure 2:
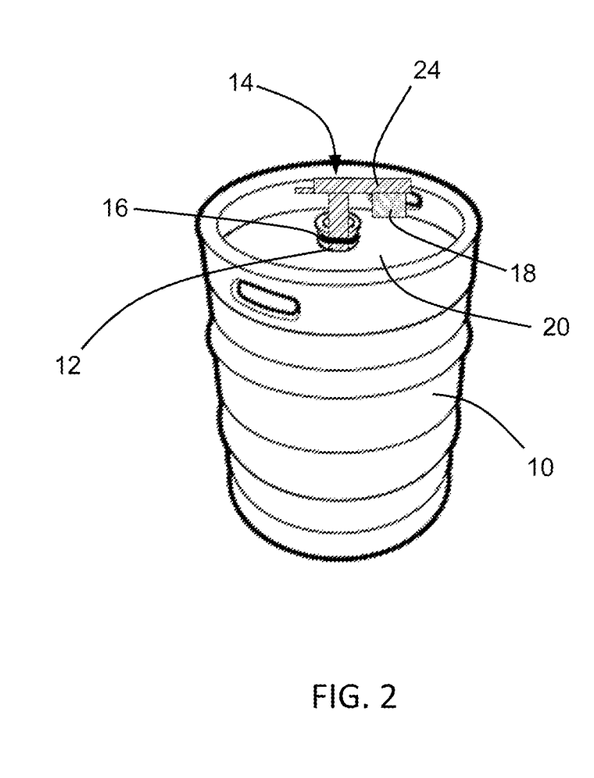

Overviews of two nonlimiting embodiments of automatic identification and pairing authentication systems are represented in FIGS. 1 and 2. In each of FIGS. 1 and 2, the systems are represented as comprising a keg identification (ID) unit 16 integrated onto the keg 10 in the vicinity of the neck 12 of the keg 10 in which the opening (bung) of the keg 10 is disposed, and a pairing device 18 integrated onto the tap 14 installed in the opening of the keg 10. The ID unit 16 of FIG. 1 is represented as being mounted on the end wall 20 of the keg 10 in which the neck 12 is formed, and as completely and continuously encircling the neck 12. The ID unit 16 of FIG. 2 is represented as mounted directly on and around the perimeter of the neck 12 and completely and continuously encircling the neck 12. The ID unit 16 of FIGS. 1 and/or 2 may be separately manufactured and then permanently attached to its keg 10, though it is foreseeable that portions of the units 16 could be incorporated directly into the design of the keg 10. As discussed below in reference to FIGS. 3A through 5B, each ID unit 16 may comprise one or more short-range wireless identification (ID) devices 26 that are packaged or embedded within a housing or enclosure 32. The ID devices 26 create a field that may encompass the entire perimeter of the neck 12 or up to and including the entire end wall 20 of the keg 10. If the ID unit 16 comprises multiple ID devices 26, the ID devices 26 may be spaced apart from each other within the enclosure 32. The enclosure 32 may include openings or channels to allow any contents of the keg 10 that leak or spill to be able to pass behind, beneath, or through the enclosure 32 and not accumulate behind or above the enclosure 32, as would be the case if the end wall 20 slopes downward from the neck 12.

The taps 14 are represented in FIGS. 1 and 2 as each having a handle 24 that contains the pairing device 18 or to which the pairing device 18 is otherwise mounted, for example, below the handle 24 as shown, or above or to one side of the handle 24. The pairing devices 18 function as authentication units to confirm the identity of its respective keg 10 through its associated ID unit 16. The pairing devices each include a receiver for receiving short-range wireless information from one or more short-range wireless ID devices 26 of the ID unit 16. In some embodiments, the wireless information is a short-range wireless transmission such as a near-field RF (also known as inductively coupled) link such as low-frequency (LF) or high-frequency (HF) radio identification device, in which case the one or more ID devices 26 of the ID unit 16 are radio-frequency identification (RFID) devices (discussed in reference to FIGS. 3A, 3B, 4A, and 4B). Alternatively the short-range wireless information may be an image transmitted by an optical/vision link, for example, as a result of the one or more short-range wireless ID devices 26 of the ID unit 16 comprising barcodes (discussed in reference to FIGS. 5A and 5B). It is noted that other short-range wireless information links could be employed, as nonlimiting examples, acoustic or vibration links or capacitive coupling between the ID units 16 and pairing device 18. In the case of an acoustic or vibration link, the ID devices 26 of the ID unit 16 are acoustic or vibration devices that transmit unique acoustic or vibration signals that can be detected by a microphone or accelerometer associated with the pairing device 18.

The reliability of automatic ID pairing between the ID units 16 and pairing devices 18 described above is obtained by using a short-range wireless information link between the ID unit 16 located on the keg 10 and the pairing device 18 located on the tap 14 to reduce the likelihood of crosstalk between pairing devices 18 and the ID units 16 of adjacent kegs 10. In particular, the embodiments of automatic identification and pairing authentication systems represented in the drawings utilize short-range wireless ID devices 26 with sufficiently short-range wireless transmission capabilities so that a pairing device 18 mounted on a tap 14 does not automatically identify and pair with a second keg that is immediately adjacent and possibly even abutting the keg 10 on which the tap 14 is installed. Reliability of the automatic ID pairing between an ID unit 16 and pairing device 18 is promoted as a result of the ID unit 16 surrounding the opening of the keg 10, such that the pairing device 18 is never misaligned with the ID unit 16 and instead the unit 16 is always in proximity to its pairing device 18 regardless of the rotational position of the pairing device 18 on the keg 10, a situation that inherently occurs due to the rotational position of the tap 14 relative to the keg 10 varying depending on the start and end of the thread turns that secure the tap 14 to the keg 10.

Figure 3A:
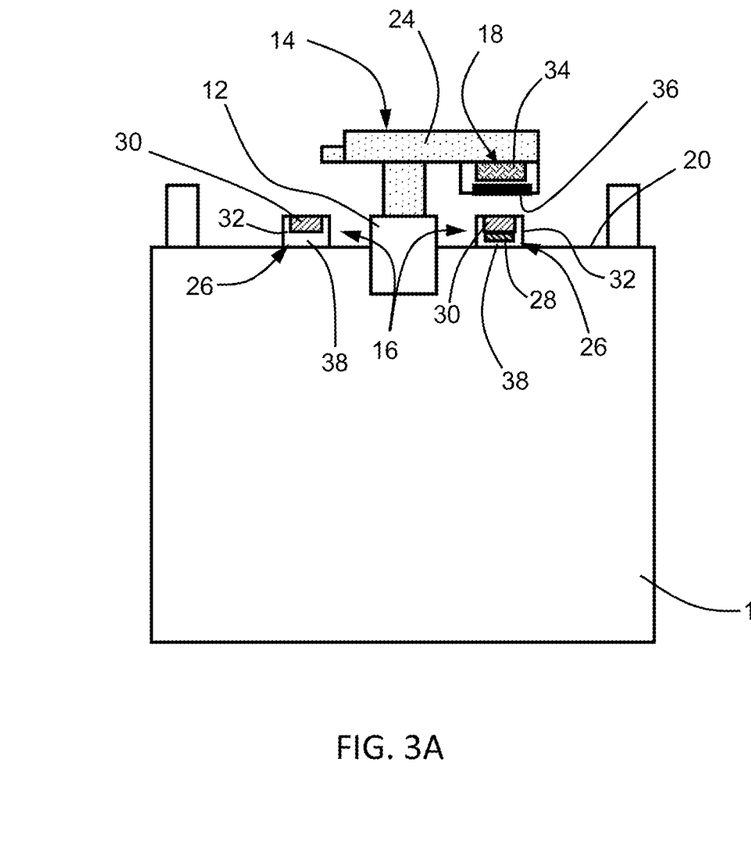
FIGS. 3A and 3B schematically represent a nonlimiting embodiment of an automatic identification and pairing authentication system comprising a keg ID unit integrated onto a keg and a pairing device integrated onto a tap installed on the keg, wherein the ID unit comprises a single RFID device with an antenna that encircles the entire opening of the keg.
Figure 3B:
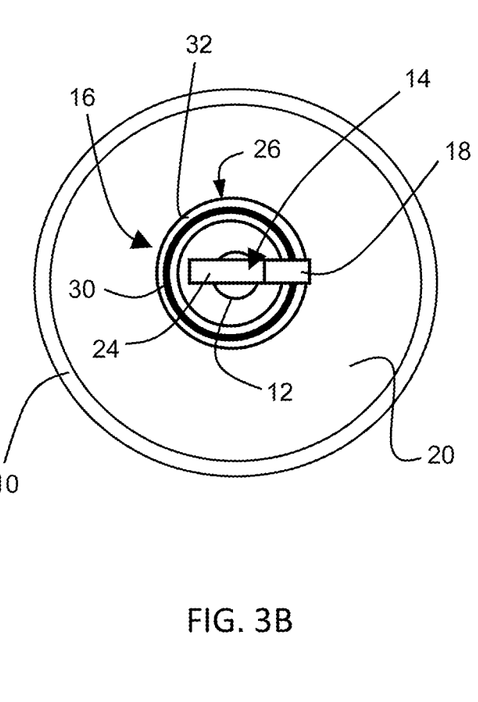

FIGS. 3A and 3B represent an embodiment in which short-range wireless transmission is utilized and based on inductive-coupling as a result of the short-range wireless ID device 26 of the ID unit 16 comprising a single RFID device 26 with which the pairing device 18 is able to inductively couple. Examples of international standardized links are low-frequency (LF) (125-134 kHz) such as ISO 11784/5 and ISO 14223, and high-frequency (HF) (13.56 MHZ) such as ISO15693 and NFC. The RFID device 26 comprises an RFID chip 28 connected to an antenna 30, both of which are encased or enclosed in a housing or enclosure 32. The antenna 30 may be a multi-turn coil shown as encompassing the entire perimeter of the keg neck 12. The pairing device 18 comprises, as a receiver, an RFID reader (interrogator) 34 and an interrogator antenna 36, for example, a multi-turn square or circular winding coil, which for improved operation is placed at the bottom of the pairing device 18 facing the antenna 30 of the ID device 26. The antenna 30 is packaged or embedded within the enclosure 32 so that a gap 38 filled with air or a dielectric material is present between the antenna 30 and the surface of the end wall 20 of the keg 10, which is ordinarily formed of steel, aluminum, or possibly another metal. The gap 38 provides a better path for the RF field of the interrogator antenna 36 that intersects the antenna 30, as needed for its operation. The antenna 30 may have various forms and its radius may be such that it is directly below the interrogator antenna 36 as shown in FIGS. 3A and 3B, though it is foreseeable that the antenna 30 may be located radially inward or outward of the antenna 36.

Figure 4A:
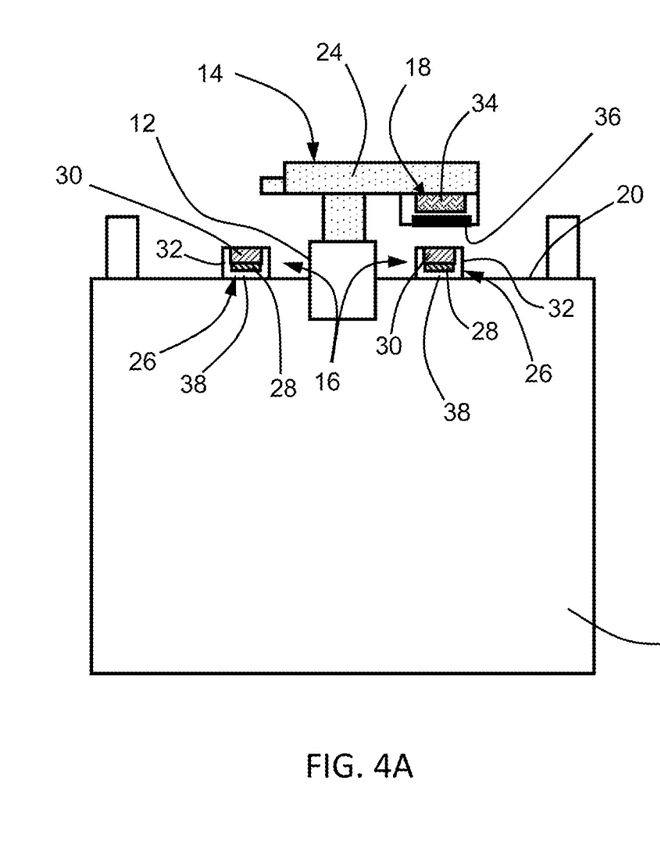
FIGS. 4A and 4B schematically represent a nonlimiting embodiment of an automatic identification and pairing authentication system comprising a keg ID unit integrated onto a keg and a pairing device integrated onto a tap installed on the keg, wherein the ID unit comprises multiple RFID devices spaced apart in an enclosure that encircles the opening of the keg.
Figure 4B:
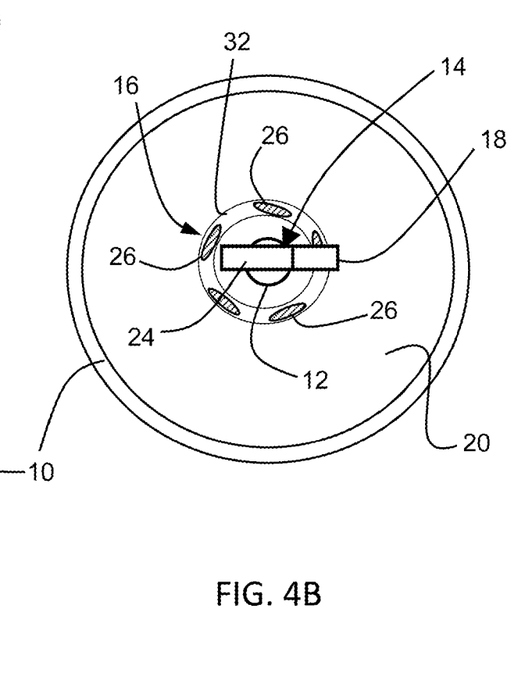

FIGS. 4A and 4B represent another embodiment in which the ID unit 16 utilizes short-range wireless transmission based on RFID technology, but in this case multiple individual RFID devices (tags) 26 are used whose operations with the pairing device 18 are based on inductive-coupling. Nonlimiting embodiments of RFID devices 26 for this purpose include glass-encapsulated LF RFID tags of the types used for animal tracking and small NFC chips and labels with integrated antennae, the latter of which may be folded inside the enclosure 32. Each RFID device 26 comprises an RFID chip 28 connected to an antenna 30, both of which are encased or enclosed in the enclosure 32 such that an air or dielectric gap 38 is present between the antenna 30 and the metal surface of the end wall 20. The RFID devices 26 are distributed along the perimeter of the keg neck 12 to provide distributed coverage around the entire neck 12 and capable of reliably pairing with the interrogator antenna 36 of the pairing device 18 mounted to the tap handle 24, regardless of the rotational position of the handle 24 relative to the keg neck 12.

Figure 5A:
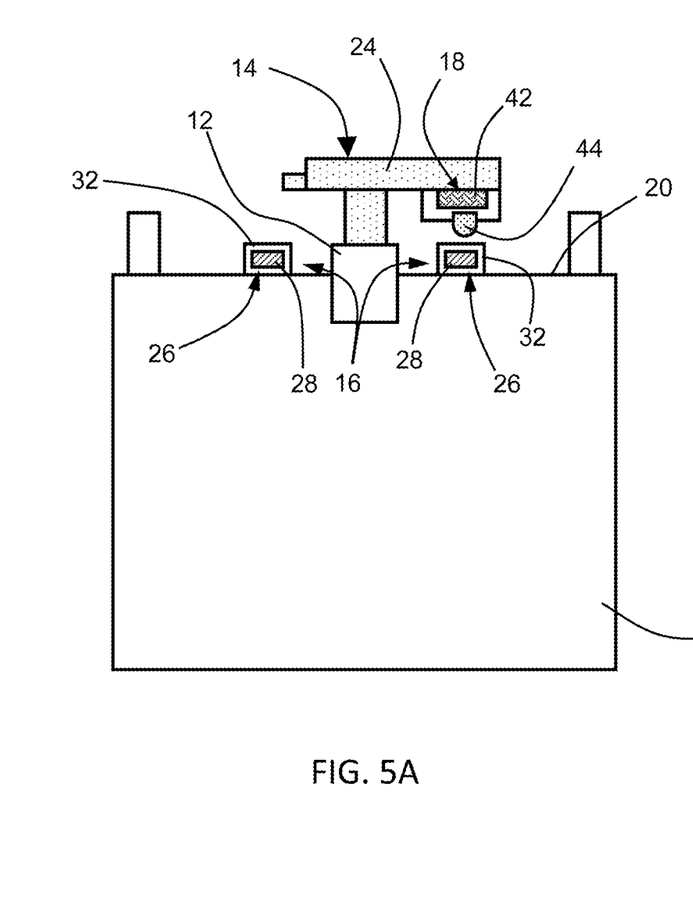
FIGS. 5A and 5B schematically represent a nonlimiting embodiment of an automatic identification and pairing authentication system comprising a keg ID unit integrated onto a keg and a pairing device integrated onto a tap installed on the keg, wherein the ID unit comprises multiple two-dimensional (2D) barcodes spaced apart in an enclosure that encircles the opening of the keg.
Figure 5B:
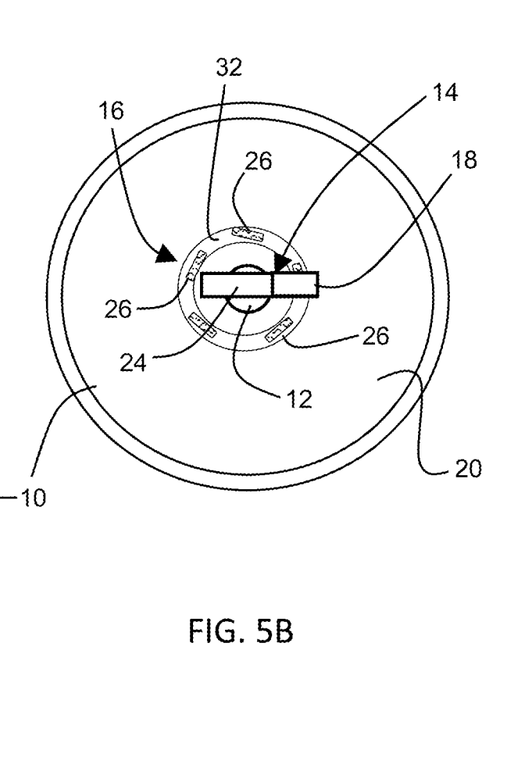

FIGS. 5A and 5B represent an embodiment in which the short-range wireless information is an image transmitted by an optical/vision link based on optics as a result of the short-range wireless ID device 26 of the ID unit 16 comprising one or more optical ID devices and the link between the ID devices 26 and pairing device 18 being established optically (i.e., vision). FIGS. 5A and 5B show such an embodiment in which multiple individual optical devices 26 each comprise a two-dimensional barcode 28 embedded in a translucent enclosure 32 that renders the barcodes 28 not visible or at least not readily visible to the human eye, but is visible to, as a nonlimiting example, an infrared camera module 42 as the receiver of the pairing device 18 mounted to the tap handle 24. The pairing device 18 further includes a lens 44 that, depending on the rotational position of the tap 14, is able to capture and read at least one of the barcodes 28. The image of the barcode 28 can then be decoded at the pairing device 18 or transmitted to a remote device for further processing and pairing.

The RFID and optical links of the embodiments of FIGS. 4A, 4B, 5A, and 5C may be replaced with an acoustic or vibration link, in which the short-range wireless ID devices 26 of their ID units 16 are acoustic or vibration-producing ID devices that transmit a unique acoustic or vibration signal that can be detected by a microphone or accelerometer associated with the pairing device 18 in place of the RFID reader (interrogator) 34 and camera module 42.

The above embodiments are all preferably capable of operating without requiring a battery for powering the ID unit 16 mounted to the keg 10. This is desirable due to cost and to mitigate any concerns regarding high temperature exposure during washing and cleaning the keg 10. Even so, it is foreseeable that a battery-powered ID unit 16 could be used, as a nonlimiting example, battery-assisted RFID tag(s).

Figure 6:
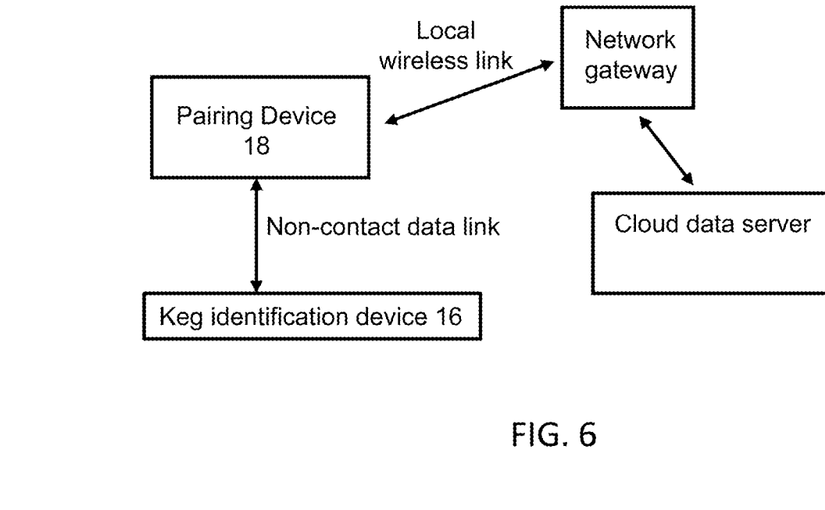
FIG. 6 is a flow chart representing a pairing device connected to a remote data server through a wireless network gateway.
Figure 7:
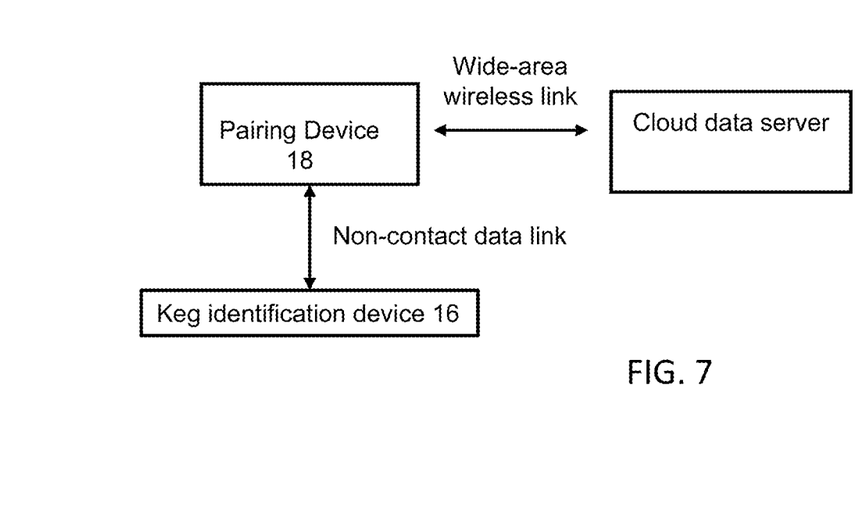
FIG. 7 is a flow chart representing a pairing device directly connected to a remote data server through a wide-area wireless link.

In the embodiments described above and shown in the drawings, the pairing device 18 integrated with the tap 14 identifies the keg 10 by interrogating the ID device(s) 26 of its ID unit 16. The ID unit 16 transmits an ID code associated with the keg 10 to the pairing device 18, after which the pairing device 18 may compare the code with a digitally pre-stored set of valid ID codes in an on-board memory device to make the authentication, or the pairing device 18 may transmit the ID code of the keg 10 and its own ID code to a network gateway (as shown in FIG. 6) or directly to a remote data server (as illustrated in FIG. 7). In the embodiment shown in FIG. 6, a local wireless link can be realized by a low-power local wireless network such as Bluetooth, WiFi, or proprietary wireless. The embodiment shown in FIG. 7 requires a wide-area wireless link such as cellular or LoRa.

The cloud data servers of FIGS. 6 and 7 may include the digitally pre-stored set of valid ID codes of any number of kegs 10, as well as data related to any number of taps 14 including their assigned locations, and performs the pairing authentication using software. The cloud data sever may also include a user dashboard and business rules engine that, depending on its settings, may issue alerts via a software dashboard or by email, an SMS text message, or an automated phone call. Alternatively or in addition, cloud data sever may issue reports and take actions such as shutting down the tap 14 if it includes an internal valve that can be actuated with a solenoid or other suitable device.

Figure 8:
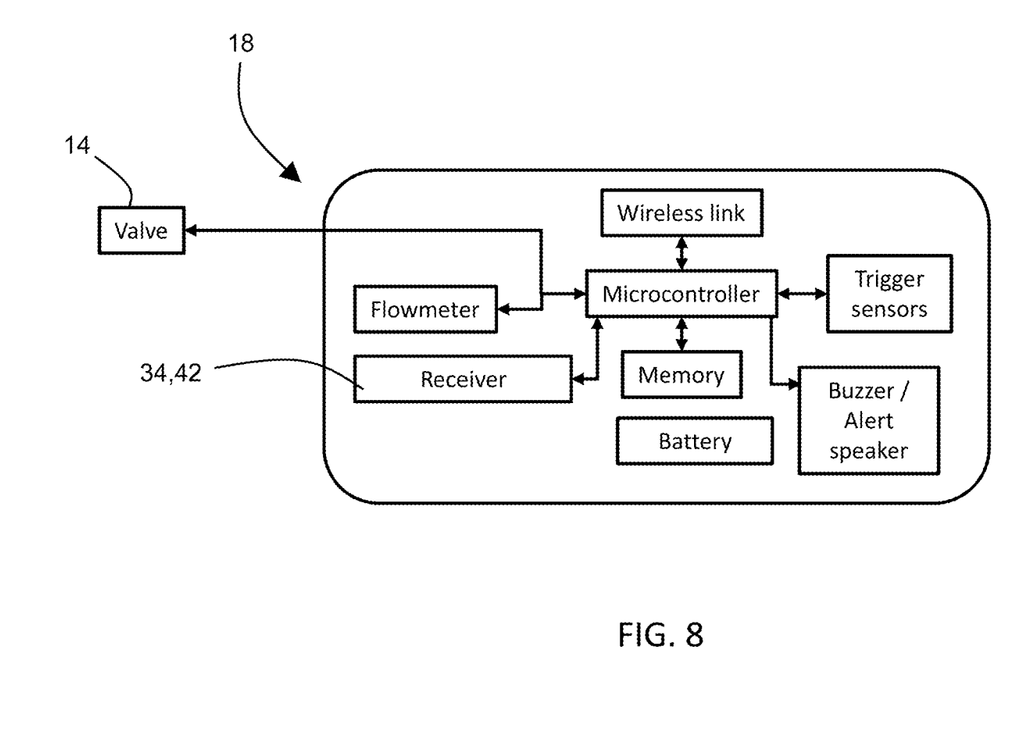
FIG. 8 is a block diagram representing components of a pairing device capable of use in any of the embodiments of FIGS. 1 through 7.

As represented by the nonlimiting embodiment of FIG. 8, the pairing device 18 optionally but preferably is battery powered, and therefore the electronic components of the device 18 are preferably designed to be power efficient to increase battery life. FIG. 8 is a block diagram of the pairing device 18 with various functional block options. For example, in addition to an RFID reader (interrogator) 34 or camera module 42, the device 18 may employ trigger sensors capable of triggering the pairing device 18 to power up and operate only when an action or sequence of actions occurs, such as activating the tap 14 by pressing the tap handle 24, and/or when certain motions or orientation profiles are observed. The device 18 is also shown as including a microcontroller and memory, which may have different degrees of capability and size to perform simple functions such as storing the set of valid ID codes and performing basic system operation commands, to having a dynamic database of valid keg ID codes and performing authentication and pairing. Complex operations increase the battery draw and increase the complexity and cost of the pairing device 18, which may not be preferred for some situations. The pairing device 18 may also generate an alert if an authentication failure occurs. Such an alert may be performed locally by including a speaker as part of the device 18 for emitting a buzzer or other audible alert, performed remotely at a remote server, or both. Other actions in the case of lack of authentication may include shutting off an electronic valve within the tap 14. Such actions require two-way communications between the pairing device 18 and a server if a pairing check is performed remotely or additional server verification is required. The pairing device 18 may also include a flowmeter to monitor and measure the beer usage, manage keg replacement, billing, and operational data analytics or control beer flow through a valve within the tap 14, and may close the valve in the event that the tap 14 is incorrectly paired with a keg. In some embodiments the microcontroller includes a real-time clock used to record time and location of incorrect pairing of the tap 14 with a non-original keg. Location information of the pairing device 18 may be derived from a network gateway (FIG. 6), cellular triangulation (FIG. 7), time-location history, etc. Communications between the ID device 26, pairing device 18, and a server may also be used to provide automatic identification of kegs and taps in a keg supply chain, including with respect to factory cleaning, refilling, transportation, and storage. Though the features described above may be desirable for many applications, the pairing device 18 is not required to include all of the various functional blocks represented in FIG. 8.

While the invention has been described in terms of particular embodiments, it should be apparent that alternatives could be adopted by one skilled in the art. For example, the automatic identification and pairing authentication systems, its ID and pairing devices 16 and 18, and their components could differ from the embodiments described herein and shown in the drawings, and functions of certain components of the devices 16 and 18 could be performed by components of different construction but capable of a similar (though not necessarily equivalent) function. As such, it should be understood that the intent of the above detailed description is to describe the particular embodiments represented in the drawings and certain but not necessarily all features and aspects thereof, and to identify certain but not necessarily all alternatives to the particular embodiments represented in the drawings. As a nonlimiting example, the invention encompasses additional or alternative embodiments in which one or more features or aspects of a particular embodiment could be eliminated or two or more features or aspects of different described embodiments could be combined. Accordingly, it should be understood that the invention is not necessarily limited to any particular embodiment represented in the drawings or described herein, and that the purpose of the above detailed description and the phraseology and terminology employed therein is to describe the particular embodiments represented in the drawings, and not necessarily to serve as limitations to the scope of the invention. Therefore, the scope of the invention is to be limited only by the following claims.

The invention claimed is:

1. An automatic identification and pairing authentication system for pairing a keg with a tap installed on the keg, the keg having an end wall surrounding an opening of the keg in which the tap is installed, the system comprising:

an identification unit compromising a plurality of short-range wireless identification devices integrated onto the end wall of the keg, the plurality of short-range wireless identification devices being distributed along a perimeter of the opening of the keg in which the tap is installed, each of the plurality of short-range wireless identification devices individually having an antenna; and a pairing device on the tap, the pairing device comprising a receiver for receiving short-range wireless information from the antennas of the plurality of short-range wireless devices of the identification unit, the short-range wireless information of the plurality of short-range wireless identification devices being transmitted with a sufficiently short-range wireless transmission capability so that the pairing device on the tap installed on the keg is capable of identifying and pairing with only the plurality of short-range wireless identification devices on the keg and, depending on a rotational position of the tap, identifies and pairs with at least one of the plurality of short-range wireless identification devices on the keg;

wherein the plurality of short-range wireless identification devices are distributed along the perimeter of the opening of the keg so that the pairing device identifies and verifies pairing of the keg and the tap regardless of the rotational position of the tap relative to the keg.

2. The automatic identification and pairing authentication system in claim 1, wherein the plurality of short-range wireless identification devices are within an enclosure that encircles the opening on the end wall of the keg.

3. The automatic identification and pairing authentication system in claim 2, wherein the enclosure is on a neck of the keg in which the opening of the keg is disposed and the plurality of short-range wireless identification devices encircle the opening of the keg.

4. The automatic identification and pairing authentication system of claim 1, wherein the short-range wireless information is a near-field radio frequency transmission, and the plurality of short-range wireless identification devices are radio-frequency identification devices that are inductively coupled to the pairing device.

5. The automatic identification and pairing authentication system in claim 4, wherein the plurality of short-range wireless identification devices are within an enclosure and an air or dielectric gap is between the antennas of the plurality of short-range wireless identification devices and the end wall of the keg.

6. The automatic identification and pairing authentication system of claim 1, wherein the short-range wireless information is an image and the plurality of short-range wireless identification devices are optically linked to the pairing device.

7. The automatic identification and pairing authentication system of claim 6, wherein the plurality of short-range wireless identification devices are a barcode.

8. The automatic identification and pairing authentication system of claim 6, wherein the pairing device comprises a camera and the plurality of short-range wireless identification devices are within a translucent enclosure that encircles the opening of the keg.

9. The automatic identification and pairing authentication system of claim 8, wherein the camera is an infrared camera.

10. The automatic identification and pairing authentication system of claim 8, wherein the plurality of short-range wireless identification devices are acoustic or vibration-producing devices.

11. The automatic identification and pairing authentication system of claim 1, wherein the pairing device performs the identifying and verifying of the pairing of the keg and the tap.

12. The automatic identification and pairing authentication system of claim 1, further comprising a remote data server, wherein the pairing device wirelessly communicates with the remote data server to identify and verify pairing of the keg and the tap.

13. The automatic identification and pairing authentication system of claim 12, further comprising a gateway to which the pairing device is wireless linked, and the gateway is connected to the remote data server.

14. The automatic identification and pairing authentication system of claim 1, wherein the pairing device further comprises a flowmeter that monitors and measures flow through the tap of a beverage contained in the keg.

15. The automatic identification and pairing authentication system of claim 14, wherein the pairing device controls the flow of the beverage through a valve within the tap.

16. The automatic identification and pairing authentication system of claim 1, wherein the pairing device further comprises trigger sensors that detect activation of the tap and initiating of pairing of the tap and the keg.

17. The automatic identification and pairing authentication system of claim 1, wherein the pairing device further comprises means for generating an alert.

18. The automatic identification and pairing authentication system of claim 1, wherein the pairing device further comprises a real-time clock that records time of activation of the tap and/or initiation of pairing of the tap and the keg.

19. An automatic identification and pairing authentication system for pairing at least a first keg with a first tap, the first keg and at least a second keg each having an end wall surrounding an opening, the first tap being installed in the opening in the end wall of the first keg, the system comprising:
   first and second identification units compromising, respectively, at least a first short-range wireless identification device and at least a second short-range wireless identification device that transmit, respectively, first and second short-range wireless information, the first short-range wireless identification device being integrated onto the end wall of the first keg and the second short-range wireless identification device being integrated onto the end wall of the second keg, the first and second short-range wireless identification devices of the first and second identification units surrounding the opening of the first and second kegs, respectively; and
   a first pairing device located on the first tap, the first pairing device comprising a receiver for receiving the first short-range wireless information from the first short-range wireless identification device of the first identification unit;
   wherein the first short-range wireless identification device surrounds the opening of the first keg so that the first pairing device identifies and verifies pairing of the first keg and the first tap regardless of a rotational position of the first tap relative to the first keg, and the first and second short-range wireless information of the first and second short-range wireless identification devices are transmitted with a sufficiently short-range wireless transmission capability so that the first pairing device on the first tap installed on the first keg does not identify and pair with the second short-range wireless identification device on the second keg when the first and second kegs are located adjacent each other.

20. The automatic identification and pairing authentication system in claim 19, wherein the first and second short-range wireless information of the first and second pluralities of short-range wireless identification devices are transmitted with a sufficiently short-range wireless transmission capability so that the first pairing device on the first tap installed on the first keg does not identify and pair with the second plurality of short-range wireless identification devices on the second keg and the second pairing device on the second tap installed on the second keg does not identify and pair with the first plurality of short-range wireless identification devices on the first keg when the first and second kegs abut each other.

21. The automatic identification and pairing authentication system in claim 19, wherein the first short-range wireless identification device and the second short-range wireless identification device each comprises a single antenna that encircles the opening on the end wall of the first and second kegs, respectively.

22. The automatic identification and pairing authentication system in claim 19, wherein the first short-range wireless identification device is one of a plurality of first short-range wireless identification devices that each comprise an antenna and the second short-range wireless identification device is one of a plurality of second short-range wireless identification devices that each comprise an antenna.

23. A method of automatically identifying and pairing a keg with a tap installed on the keg, the keg having an end wall surrounding an opening of the keg in which the tap is installed, the method comprising:
   providing an identification unit compromising a plurality of short-range wireless identification devices integrated onto the end wall of the keg, the plurality of short-range wireless identification devices being distributed along a perimeter of the opening of the keg in which the tap is installed, each of the plurality of short-range wireless identification devices individually having an antenna, the plurality of short-range wireless identification devices providing short-range wireless information;
   providing a pairing device on the tap to receive the short-range wireless information from the plurality of short-range wireless identification devices, the short-range wireless information of the plurality of short-range wireless identification devices being transmitted with a sufficiently short-range wireless transmission capability so that the pairing device on the tap is capable of identifying and pairing with only the plurality of short-range wireless identification devices on the keg and, depending on a rotational position of the tap, identifies and pairs with at least one of the plurality of short-range wireless identification devices on the keg; and
   identifying and verifying pairing of the keg and the tap with the pairing device and the short-range wireless information received from the at least one of the plurality of short-range wireless identification devices regardless of the rotational position of the tap relative to the keg.

24. The method of claim 23, wherein the keg contains a beverage and the pairing device measures and controls flow of the beverage through a valve of the tap.

25. The method in claim 23, wherein the pairing device closes the valve if the tap is incorrectly paired with the keg.

26. The method in claim 23, wherein the pairing device generates an alert if the tap is incorrectly paired with the keg.

27. The method in claim 23, wherein the pairing device stores and wirelessly transmits activation of the tap and/or initiation of pairing of the tap and the keg.

28. A method of automatically identifying and pairing at least a first keg with a first tap, the first keg and at least a second keg each having an end wall surrounding an opening, the first tap being installed in the opening in the end wall of the first keg, the method comprising:

provided first and second identification units compromising, respectively, at least a first short-range wireless identification device and at least a second short-range wireless identification device that transmit, respectively, first and second short-range wireless information, the first short-range wireless identification device being integrated onto the end wall of the first keg and the second short-range wireless identification device being integrated onto the end wall of the second keg, the first and second short-range wireless identification devices of the first and second identification units surrounding the opening of the first and second kegs, respectively;

providing a first pairing device located on the first tap, the first pairing device comprising a receiver for receiving the first short-range wireless information from the first short-range wireless identification device of the first identification unit, the first and second short-range wireless information of the first and second short-range wireless identification devices are transmitted with a sufficiently short-range wireless transmission capability so that the first pairing device on the first tap installed on the first keg does not identify and pair with the second short-range wireless identification device on the second keg when the first and second kegs are located adjacent each other; and identifying and verifying pairing of the first keg and the first tap with the first pairing device and the first short-range wireless information received from the first short-range wireless identification device regardless of a rotational position of the first tap relative to the first keg.

29. The method of claim 28, wherein the first keg contains a beverage and the first pairing device measures and controls flow of the beverage through a valve of the first tap.

30. The method in claim 29, wherein the first pairing device closes the valve if the first tap is incorrectly paired with the first keg.

31. The method in claim 28, wherein the first pairing device generates an alert if the first tap is incorrectly paired with the first keg.

32. The method in claim 28, wherein the first pairing device stores and wirelessly transmits activation of the first tap and/or initiation of pairing of the first tap and the first keg.

* * * * *